United States Patent Office 3,346,560
Patented Oct. 10, 1967

3,346,560
PURINE 3-DEOXYNUCLEOSIDES
George E. Boxer, Westfield, N.J., assignor to Merck & Co., Inc., Rahway, N.J., a corporation of New Jersey
No Drawing. Filed Jan. 29, 1965, Ser. No. 429,162
9 Claims. (Cl. 260—211.5)

This invention relates to nucleosides and more particularly to purine 3'-deoxy nucleosides. Specifically, it relates to novel substituted 3'-deoxy-ribofuranosyl purines and novel intermediates used in preparing them.

The novel end compounds of the present invention have the following structural formula:

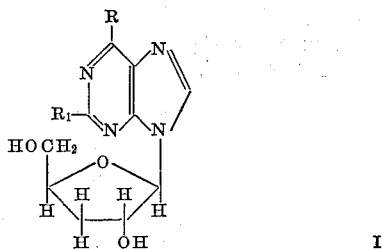

I wherein R may be hydrogen, amino, alkylamino such as methylamino, ethylamino, butylamino, and the like, dialkylamino such as dimethylamino, diethylamino, dibutylamino, and the like, mercapto, hydroxy, chloro, or bromo, and $R_1$ may be hydrogen or amino provided that $R_1$ is not hydrogen when R is amino. The compounds may be termed generally $2R_1$-6R-9-(3-deoxy-$\beta$-D-ribofuranosyl)purines, although also included within the scope of the invention is the 7-isomer of Compounds I when R is hydroxy. Typical among the foregoing Compounds I are the following:

2,6-diamino-9-(3-deoxy-$\beta$-D-ribofuranosyl)purine,
6-mercapto-9-(3-deoxy-$\beta$-D-ribofuranosyl)purine,
6-methylamino-9-(3-deoxy-$\beta$-D-ribofuranosyl)purine,
6-ethylamino-9-(3-deoxy-$\beta$-D-ribofuranosyl)purine,
9-(3-deoxy-$\beta$-D-ribofuranosyl)purine which may also be called 3'-deoxynebularine,
6-chloro-9-(3-deoxy-$\beta$-D-ribofuranosyl)purine,
2-amino-6-hydroxy-9-(3-deoxy-$\beta$-D-ribofuranosyl)purine which may also be called 3'-deoxyguanosine,
2-amino-6-hydroxy-7-(3-deoxy-$\beta$-D-ribofuranosyl)purine which may also be called 7-(3-deoxy-$\beta$-D-ribofuranosyl)guanine,
6-dimethylamino-9-(3-deoxy-$\beta$-D-ribofuranosyl)purine,
6-diethylamino-9-(3-deoxy-$\beta$-D-ribofuranosyl)purine, and the like. Preferred among the foregoing are 2,6-diamino-9-(3-deoxy-$\beta$-D-ribofuranosyl)purine,
6-methylamino-9-(3-deoxy-$\beta$-D-ribofuranosyl)purine,
6-ethylamino-9-(3-deoxy-$\beta$-D-ribofuranosyl)purine,
2-amino-6-hydroxy-9-(3-deoxy-$\beta$-D-ribofuranosyl)purine, and
6-dimethylamino-9-(3-deoxy-$\beta$-D-ribofuranosyl)purine.

In general, Compounds I are prepared by treating a starting 2-, 6-, or 2,6-substituted-9-(2,5-di-O-acyl-3-deoxy-ribofuranosyl)purine to introduce the proper functionality at the 2- and/or 6-positions of the purine moiety as desired. The resulting compound is then deacylated to yield Compounds I. Under certain circumstances, as will be more fully described hereinafter, separate deacylation is not necessary, it being accomplished during the same manipulative step which introduces the proper 2- or 6-functionality into the purine nucleus.

Structurally, the starting compounds, which are novel, are generally depicted as follows:

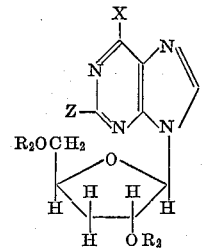

II wherein X is hydrogen, mercapto, hydroxyl, chloro, bromo, or an acylamino radical —$NR_3Y$ wherein Y is an acyl residue of an organic carboxylic acid exemplified by alkanoyl such as acetyl, propionyl, and the like, aroyl and substituted aroyl such as benzoyl and nitrobenzoyl, $R_2$ is an acyl residue of an organic carboxylic acid such as alkanoyl, aroyl, substituted aroyl, and represented further by acetyl, propionyl, butyryl, benzoyl, nitrobenzoyl, and the like, $R_3$ is hydrogen or alkyl, and Z is hydrogen or —NHY where Y is as above defined. Such starting materials are novel and are typified by 6-chloro-9-(2,5-di-O-benzoyl-3-deoxy-$\beta$-D-ribofuranosyl)purine,
6-bromo-9-(2,5-di-O-benzoyl-3-deoxy-$\beta$-D-ribofuranosyl)purine,
2-benzamido-6-chloro-9-(2,5-di-O-benzoyl-3-deoxy-$\beta$-D-ribofuranosyl)purine,
2-acetamido-6-hydroxyl-9-(2,5-di-O-benzoyl-3-deoxy-$\beta$-D-ribofuranosyl)purine,
6-hydroxy-9-(2,5-di-O-benzoyl-3-deoxy-$\beta$-D-ribofuranosyl)purine,
2,6-benzamido-9-(2,5-di-O-benzoyl-3-deoxy-$\beta$-D-ribofuranosyl)purine,
2-benzamido-9-(2,5-di-O-benzoyl-3-deoxy-$\beta$-D-ribofuranosyl)purine,
6-benzamido-9-(2,5-di-O-benzoyl-3-deoxy-$\beta$-D-ribofuranosyl)purine,
6-mercapto-9-(2,5-di-O-benzoyl-3-deoxy-$\beta$-D-ribofuranosyl)purine,
9-(2,5-di-O-benzoyl-3-deoxy-$\beta$-D-ribofuranosyl)purine
9-(2,5-di-O-acetyl-3-deoxy-$\beta$-D-ribofuranosyl)purine,
9-(2,5-di-O-[p-nitrobenzoyl]-3-deoxy-$\beta$-D-ribofuranosyl)purine,
9-(2,5-di-O-propionyl-3-deoxy-$\beta$-D-ribofuranosyl)purine,
2-benzamido-6-bromo-9-(2,5-di-O-benzoyl-3-deoxy-$\beta$-D-ribofuranosyl)purine,
6-chloro-9-(2,5-di-O-acetyl-3-deoxy-$\beta$-D-ribofuranosyl)purine,
6-bromo-9-(2,5-di-O-acetyl-3-deoxy-$\beta$-D-ribofuranosyl)purine,
2-acetamido-6-chloro-9-(2,5-di-O-benzoyl-3-deoxy-$\beta$-D-ribofuranosyl)purine, and
2-acetamido-6-bromo-9-(2,5-di-O-benzoyl-3-deoxy-$\beta$-D-ribofuranosyl)purine.

According to one aspect of the invention, Compounds I wherein R is amino, alkylamino, or dialkylamino, and $R_1$ is hydrogen or amino, are produced from Compounds II with X being chloro or bromo, preferably chloro, and Z being hydrogen or acylamino, depending on whether a 2-substituted product is desired or not. Such Compounds II are treated with ammonia, an alkylamine such as methylamine, ethylamine, and the like, a dialkylamine such as dimethylamine, diethylamine, and the like, in order to replace the 6-halo atom with the appropriate amine function. Thus, for example, when ammonia is used, a 6-amino group results; when methylamine is employed, a 6-methylamino results. In a similar fashion, higher alkylamines may be employed to introduce the corresponding alkyl group at the 6-position. Preferably the reaction is carried out in the presence of a solvent.

The amination temperature should be higher than room temperature, suitable results being obtained at temperatures between 50° C. and 150° C. using preferably an excess of the amine. In this regard, ordinarily there is supplied to the system at least one mole of amine for each acyl group present plus at least two moles for each halogen atom present. In practice good results are obtained when from 2–10 times that amount is used. It is also preferred to employ a sealed system for the reaction to prevent loss of volatile amines. The reaction is effective to produce compounds I by the simultaneous substitution of the 6-chloro or bromo atom with the appropriate amine function while at the same time effecting the deacylation at the 2,5-O-positions and of the 2-acylamino group when the 2-position of the purine is so substituted. As suitable solvents there may be employed aliphatic alcohols such as methanol, ethanol, butanol, hexanol, and the like, dimethylsulfoxide, dioxane, ethers, and the like. Methanol is preferred. Additionally, the amine, itself, may serve as the solvent.

Alternatively, the foregoing procedure may be employed using a system which effects the deacylation without disturbing the 6-chloro or bromo atom to obtain the Compound I wherein R is chloro or bromo, that is, for example, 6 - chloro-9-(3-deoxy-$\beta$-D-ribofuranosyl)purine. Suitable systems are those described above in the amination step but wherein the reaction temperature is greatly reduced, i.e., substantially below room temperature. Temperatures of the order of −20° C. −10° C. are suitable.

Compound I wherein R is mercapto and $R_1$ is hydrogen is obtained from the corresponding 2,5-di-O-acylated nucleoside with with X being mercapto. These in turn are prepared from Compounds II wherein X is chloro or bromo, preferably chloro, by treating the chloro compound with thiourea, preferably in the presence of a solvent and preferably under refluxing conditions. As solvents there may be mentioned lower aliphatic alcohols such as methanol and ethanol, dimethylsulfoxide, dioxane, ethers, and the like, with methanol preferred. The preferred temperature for effecting the substitution of the chloro group by the mercapto group is from 50° C. up to refluxing temperature of the system. The product is Compound II with X being mercapto. Thereafter, the acyl groups at the 2,5-O-position and at the nitrogen atom of the 2-acylamino group, if present, are removed by saponification with an alkali metal alkoxide solution such as that obtained from sodium or potassium and methanol, ethanol, and the like. Methanol and sodium are preferred. The temperature is not critical, suitable results being obtained at between 50° C. and 100° C. There results from such a treatment Compounds I wherein R is mercapto and $R_1$ is hydrogen or amino.

Compound I wherein R and $R_1$ are both hydrogen, that is, 9-(3-deoxy-$\beta$-D-ribofuranosyl)purine, is prepared from the corresponding 2,5-di-O-acylated Compounds II with X and Z both being hydrogen. These are, in turn, prepared from Compounds II wherein X is chloro or bromo, preferably chloro, and Z is hydrogen, by hydrogenating Compounds II in the presence of a palladium catalyst at a temperature of from room temperature up to about 80° C. Actually, the temperature itself is not critical, it being most desirable to use slightly elevated temperatures. The reaction is carried out in the presence of an inert solvent such as methanol, ethanol, ethers, dimethylsulfoxide, dioxane, and the like, with methanol preferred. Such treatment removes the chloro or bromo atom at the 6-position and results in novel 9-(2,5-di-O-acyl-3-deoxy-$\beta$-D-ribofuranosyl)purines. Thereafter, the 2,5-O-acyl groups are removed by treatment with an alkali metal alkoxide solution as previously described in connection with the preparation of Compound I wherein R is mercapto.

As described above, Compound I wherein R and $R_1$ are either or both amino or substituted amino or both hydrogen are prepared according to the process described from the 6-halo starting material (Compound II with X being chloro or bromo). Parenthetically, whereas the novel compounds I are restricted by a proviso with respect to substituents R and $R_1$, such does not apply to the processes described herein. Alternatively, those same Compounds I may be produced from a Compound II wherein X and Z are selected from the group consisting of —$NR_3Y$ (i.e., acylamino) and preferably benzamido, and hydrogen. In accordance with this embodiment, these Compounds II are submitted to the same treatment with an alkali metal alkoxide solution as described above to form Compounds I wherein R and $R_1$ are selected from the group consisting of hydrogen and amino and substituted amino.

Compounds I wherein R is hydroxy and $R_1$ is amino or hydrogen are prepared from Compounds II, wherein X is hydroxyl and Z is hydrogen or acylamino. The following structure designated IIa depicts the compounds that may be converted.

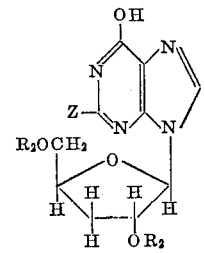

IIa

Compounds I wherein R is hydroxy and $R_1$ is hydrogen or amino are obtained from compounds IIa by submitting Compounds IIa to treatment with an alkali metal alkoxide solution as described previously. As a result of carrying out such a step, both the 7-isomer and the 9-isomer of the nucleoside are obtained; that is, for example, 2 amino-6-hydroxy-7-(3-deoxy-$\beta$-D-ribofuranosyl)purine will be obtained in addition to 2-amino-6-hydroxy-9-(3-deoxy-$\beta$-D-ribofuranosyl)purine.

As indicated previously, Compounds I are prepared from starting materials which are themselves novel compounds. The novel starting materials, i.e., Compounds II, are prepared by condensing acylated 3-deoxy-ribofuranosyl halides (halo ribosides) with the mercury halide salt of an appropriately substituted purine compound. The halo ribosides have the following structural formula:

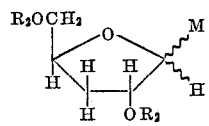

III where M is a halogen atom in either the $\alpha$ or $\beta$ configuration and $R_2$ is as previously defined. Typical of such compounds are the following: 2,5-di-O-benzoyl-3-deoxy-D-ribofuranosyl chloride, 2,5-di-O-benzoyl-3-deoxy-D-ribofuranosyl bromide, 2,5-di-O-acetyl-3-deoxy-D-ribofuranosyl bromide, 2,5-di-O-acetyl-3-deoxy-D-ribofuranosyl chloride, 2,5-di-O-(p-nitrobenzoyl)-3-deoxy-D-ribofuranosyl bromide, 2,5-di-O-(p-nitrobenzoyl)-3-deoxy-D-ribofuranosyl chloride, 2,5-di-O-propionyl-3-deoxy-D-ribofuranosyl bromide, 2,5-di-O-propionyl-3-deoxy-D-ribofuranosyl chloride, and 2,5-di-O-butyryl-3-deoxy-D-ribofuranosyl bromide, in either the $\alpha$ or $\beta$ form, and the like. Preferred among the foregoing are 2,5-di-O-acetyl-3-deoxy-D-ribofuranosyl bromide and chloride, 2,5-di-O-benzoyl-3-deoxy-D-ribofuranosyl bromide and chloride, and 2,5-di-O-(p-nitrobenzoyl)-3-deoxy-D-ribofuranosyl bromide and chloride, and most preferred are the $\beta$ forms of these. The substituted purines may be designated as follows:

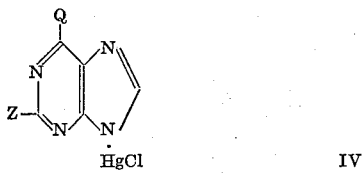

wherein Q is selected from the group consisting of hydrogen, bromo, chloro, hydroxyl and —NR$_3$Y wherein R$_3$, Y, and Z are as previously defined. The condensation of the two materials is accomplished preferably in a liquid vehicle either in solution or as a suspension to yield the mercury halide complexes of Compounds II. Such liquid vehicles as benzene, toluene, and xylene are suitable for the reaction. If desired, the reaction product may be treated to remove the mercuric halides by dissolving it in a suitable solvent such as chloroform and then washing the solution with aqueous potassium iodide solution.

Compounds III, the halo riboside used as the condensing agent, are prepared according to the following flow diagram.

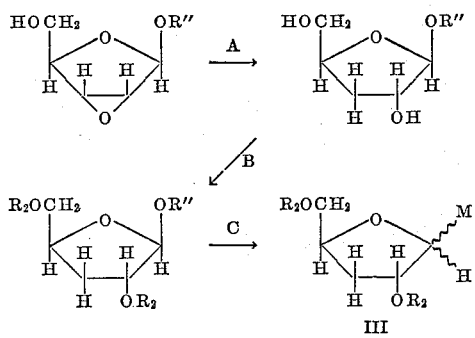

wherein R$_2$ and M are as previously defined and R″ is an alkyl radical. As can be seen, the starting material used in preparing Compounds III is an alkyl glycoside in the epoxy form and in the β,D configuration. Representative of such starting materials are methyl-2,3-anhydro-β-D-ribofuranoside, ethyl - 2,3-anhydro-β-D-ribofuranoside, pentyl-2,3-anhydro-β-D-ribofuranoside, and decyl-2,3-anhydro-β-D-ribofuranoside. The alkyl glycosides may be produced according to the procedure of C. D. Anderson, L. Goodman, and B. R. Baker, J. Am. Chem. Soc., 80, 5247 (1958), by the use of the appropriate aliphatic alcohol in place of methanol as described therein.

In general, the process involves reducing the epoxy group of the ribofuranoside in Step A to obtain the 3-deoxy derivative. After this compound is obtained, the hydroxyl groups in the 2- and 5-positions are blocked with acyl groups to protect them when the compounds are subsequently treated in Step C.

More specifically, in Step A, the hydrogen reduction of the epoxy riboside in the presence of a Raney nickel catalyst is effected. In this step, the ribofuranoside is preferably dissolved in an appropriate solvent and treated under pressure with hydrogen and with Raney nickel to effect the reduction. The temperature is critical and must be above about 35° C., suitable results being obtained within the range of from 35° C.–150° C. The preferred temperature, however, is from 55° C. to about 110° C. Temperatures higher than those indicated may be employed if desired, although no advantageous effect is observed under such conditions. With regard to the solvents, any hydrogenation solvent which is effective with the ribofuranoside will, in general, be suitable. Such solvents as lower aliphatic alcohols, such as methanol, ethanol, ethers such as diethyl, and dibutyl ether, dioxane, tetrahydrofuran, cyclohexane, and the like may be employed, with ethanol being preferred. The pressure at which the hydrogenation is run is not critical. It is preferred to employ pressures in the range of from slightly above atmospheric to about 100 p.s.i.g. Under such conditions, the reaction is normally complete within several hours. It is most preferred to introduce the desired amount of hydrogen batchwise and allow the pressure to drop as the hydrogen uptake proceeds, although the reaction may be carried out in a continuous fashion if desired. At the conclusion of the reaction, the catalyst may be separated by filtration and the solvent removed by flash vaporization and the product obtained washed in accordance with known techniques. The alkyl ribosides obtained as a result of carrying out this step are generally in the form of oils. They are normally isolated before treatment for purposes of purification, although it is not necessary to do so.

The alkyl ribosides obtained in Step A are next treated so as to block the 2,5-hydroxyl groups thereof and prevent their reaction upon subsequent conversion to the halide. This treatment involves acrylation of the alkyl riboside. The preferred acrylating agents are the acid halides and anhydrides containing the appropriate acyl residue. Thus, there may be employed alkanoyl, aroyl, and substituted aroyl halides, or appropriate acid anhydrides. These are exemplified by acetyl chloride, acetyl bromide, propionyl chloride, acetic anhydride, propionic acid anhydride, butyric acid anhydride, benzoyl bromide, benzoyl chloride, benzoic anhydride, p-nitrobenzoyl bromide, p-nitrobenzoyl chloride, and p-nitrobenzoic anhydride. The preferred reactions are a benzoylation and acetylation with a benzoyl chloride and acetic anhydride respectively. It is preferred to run the acylation in the presence of a solvent and since the reaction involves the evolution of a mole of hydrogen halide it is most preferred to use a basic solvent. Preferred are the tertiary amine-type solvents such as pyridine, N,N-diethylaniline, triethylamine, and although other vehicles such as water and benzene may be used in conjunction with either organic or inorganic bases and will produce suitable results. The reaction proceeds suitably at room temperature although temperatures within the range of 15° C. up to 45° C. may be employed. The temperature, however, is not critical and any may be employed having due consideration for the stability of the reaction system where higher temperatures are involved, and considering the economics of the reaction rate at lower temperatures. After the reaction is complete, the products are preferably extracted into a selective solvent such as ethers, esters, the halogenated aliphatic solvents, represented by chloroform, ethylene chloride, and the like. The extract may then be concentrated to yield the final acylated product. The aroyl and substituted aroyl ribofuranosides according to this step, are represented by 2,5-di-O-benzoyl and 2,5-di-O-(p-nitrobenzoyl)ribofuranoside.

In Step C, the ribofuranosides obtained from Step B are treated under anhydrous conditions to introduce a halogen atom at the 1-carbon position of the compound using an agent which yields a halogen anion in the presence of a strong acid. Such agents as hydrogen bromide, hydrogen chloride, thionyl bromide, thionyl chloride, metal halides, and the like, are suitable with hydrogen chloride and hydrogen bromide being preferred. In the case of hydrogen halides and thionyl halides, these reagents act as both the source of the halogen anion and the strong acid. The temperature of the reaction is not critical and good results are obtained at from 0–25° C. Temperatures outside the range may be employed with due consideration given to stability and economics as above described. The preferred operating temperature is about 15–20° C. The reaction itself is slightly exothermic and fairly rapid, being completed in about 20 minutes or less. Thereafter, the reaction mass is concentrated and excess solvent removed at reduced pressure. With respect to solvents, it is preferred to employ inert solvents, but the solvents themselves are not critical. Such solvents as ethers, aromatic hydrocarbons such as benzene, toluene, xylene, lower aliphatic acids such as acetic acid, and the like are suitable.

The end compounds of the present invention, compounds I, are useful in a variety of ways. They are capable of inhibiting RNA synthesis, for example, acid insoluble RNA synthesis, in Ehrlich ascites cells and KB cells. In in vitro tests the growth of KB cells and chick embryo fibroblast cells are markedly suppressed as is the inhibition of hypoxanthine incorporation into acid insoluble RNA. The compounds are, therefore, useful as antimetabolites, as cell growth inhibitors, and for the study of metabolic systems. They also demonstrate favorable cytotoxicity characteristics considered with their cell growth suppression.

The compounds may also be converted to nucleotides by treatment with phosphoric acid derivatives in accordance with known techniques. As such they are useful in the formulation of media for selective culturing of animal tissue cells, fungi, and the synthesis of polynucleotides relates to nucleic acids.

The following examples are given for the purpose of illustration only and not by way of limitation.

*Example 1.—6-dimethylamino-9-(3-deoxy-β-D-ribofuranosyl)purine*

A suspension of 0.9 g. (1.88 mmole) of 6-chloro-9-(2,5-di-O-benzoyl-3-deoxy-β-D-ribofuranosyl)purine in 25 ml. of methanol containing 7.6 g. of dimethylamine is heated for 10 hours in a sealed tube at 100° C. The solution is concentrated at reduced pressure and the residue is dissolved in 25 ml. of water. The water solution is washed with five 8-ml. portions of benzene and then treated with 2 g. of Dowex 2-X8 ($CO_3^=$) resin. The resin is filtered and washed with three 25-ml. portions of water. The combined filtrate and washings are kept at 5° C. for 20 hours. A crop (159 mg.) of product (M.P. 199–201° C.) is obtained. Concentration of the filtrate to about 20 ml. gives, after cooling at 5° C. for two hours, a second crop (122 mg.; M.P. 199–200° C.). The two crops are combined and recrystallized from 10 ml. of water and pure 6-dimethylamino-9-(3-deoxy-β-D-ribofuranosyl)purine (220 mg.; 42%; M.P. 122–220° C.) is obtained. Thin layer chromatography (TLC) on cellulose in water showed one spot (UV) of $R_f$ 0.68.

$[a]_D$ —37°, $[a]_{578}$ —39° (c. 0.5 in $H_2O$).

$\lambda_{max.}^{H_2O}$ 276 mμ (a, 18,300), 214 mμ (a, 16,000); $\lambda_{max.}^{H_2O}$ (pH 13) 276 mμ (a, 17,900); $\lambda_{max.}^{H_2O}$ (pH 1) 268 mμ (a, 18,000), 210 mμ (a, 17,300).

*Analysis.*—Calc. for $C_{12}H_{17}N_5O_3$ (279.3): C, 51.60; H, 6.14; N, 25.08. Found: C, 51.45; H, 5.95; N, 24.81.

Following the above procedure, 6-diethylamino-9-(3-deoxy - β - D-ribofuranosyl)purine is obtained when an equivalent amount of diethylamine is substituted for the dimethylamine.

Similar results are obtained when equivalent amounts of 6-bromo - 9-(2,5-di-O-benzoyl - 3-deoxy-β-D-ribofuranosyl)purine is employed in place of the 6-chloro-9-(2,5-di-O-benzoyl-3-deoxy-β-D-ribofuranosyl)purine.

In like manner, the corresponding 2,5-di-O-acetyl or propionyl compounds may be employed as starting materials in place of the 6-chloro-9-(2,5-di-O-benzoyl-3-deoxy-β-D-ribofuranosyl)purine to obtain 6-dimethylamino-9-(3-deoxy-β-D-ribofuranosyl)purine.

When ammonia is substituted in equivalent amount for dimethylamine, there is obtained 6-amino-9-(3-deoxy-β-D-ribofuranosyl)purine.

*Example 2.—2,6-Diamino-9-(3deoxy-β-D-ribofuranosyl)purine*

A mixture of 1 g. (1.4 mmole) of 2,6-dibenzamido-9-(2,5-di-O-benzoyl - 3-deoxy-β-D-ribofuranosyl)purine in 12 ml. of dry methanol is treated with a solution of 97 mg. (4.2 mmole) of sodium in 12 ml. of methanol. The mixture is refluxed for three hours and the resultant solution is concentrated at reduced pressure.

The residue is dissolved in 24 ml. of water and the pH is adjusted to about 6.5 with glacial acetic acid. The aqueous solution is extracted with five 10-ml. portions of chloroform to remove ethyl benzoate and concentrated at reduced pressure to a volume of about 3 ml. After being kept at 5° C. for 16 hours, the product is centrifuged and washed with two 0.5-ml. portions of cold water. The dried product (304 mg.) melts at about 120° C., but contamination with sodium acetate is indicated by the presence of a small amount of high-melting material. Recrystallization of 290 mg. of the product from 5 ml. of water gives 199 mg. (M.P. 120–123° C.) which still contains a small amount of high-melting impurity. The combined filtrates and washings are treated with a solution of 200 mg. of picric acid dissolved in 5 ml. of hot water. The mixture is quickly cooled to 10° C. and after two hours the picrate is filtered and washed with 10 ml. of cold water. The dried picrate (166 mg.) in 25 ml. of water at about 70° C. is treated portionwise with a total of 1.6 g. of IR45 (OH—) resin. The resin is filtered and washed with three 10-ml. portions of hot water. The colorless filtrate and washes are concentrated to 2 ml. at reduced pressure. After being kept at 5° C. for 18 hours the product (23.5 mg., M.P. 120–121° C.) is removed; combined with 178 mg. of product from above and recrystallized from 6 ml. of water. The dried 2,6-diamino-9-(3-deoxy-β-D-ribofuranosyl)purine (178 mg., 46%) melts at 120–121° C. TLC in water on cellulose shows one UV absorbing spot of $R_f$ 0.46. $[a]_D$—47°, $[a]_{546}$—58° (c. 1 in $H_2O$).

$\lambda_{max.}^{H_2O}$ 280 mμ (a, 9,709), 256 mμ (a, 8,850); $\lambda_{max.}^{0.1\,N\,HCl}$ 293 mμ (a, 9,500), 215 mμ (a, 49,955), 253 mμ (a, 10,700), 270 mμ (a, 20,750); $\lambda_{max.}^{0.1\,N\,NaOH}$ 280 mμ (a, 9,590), 256 mμ (a, 8,630).

*Analysis.*—Calc. for $C_{10}H_{14}N_6O_3$ (266.3): C, 45.11; H, 5.30; N, 31.57. Found: C, 45.13; H, 5.01; N, 31.42.

Similar results are obtained when the sodium and methanol in the foregoing procedure are replaced with equivalent amounts of potassium and ethanol.

*Example 3(a).—9-(2,5-Di-O-benzoyl-3-deoxy-β-D-ribofuranosyl)purine-6-thiol*

A suspension of 830 mg. (1.7 mmole) of 6-chloro-9-(2,5-di-O-benzoyl - 3-deoxy-β-D-ribofuranosyl)purine and 184 mg. (2.4 mmole) of thiourea in 26 ml. of ethanol is refluxed for 40 minutes. After five minutes a clear, colorless solution is attained which becomes yellow in 15 minutes and shortly thereafter colorless crystals of the product are deposited. The mixture is cooled to 25° C. and filtered. The solid is washed with three 5-ml. portions of ethanol and two 10-ml. portions of ether. The dried 9-(2,5-di-O-benzoyl - 3-deoxy-β-D-ribofuranosyl)purine-6-thil (429 mg.; 52%) melts with decomposition at 239–242° C. (stage preheated to 150° C.).

$\lambda_{max.}^{EtOH}$ 324 mμ (a, 23,500), 285 mμ (a, 4,860), 278 mμ (a, 3,960), 230 mμ (a, 33,600).

*Analysis.*—Calc. for $C_{24}H_{20}N_4O_5S$ (476.4): C, 60.50; H, 4.23; N, 11.76; S, 6.66. Found: C, 60.21; H, 4.39; N, 11.60; S, 7.02.

*Example 3(b).—9-(3-deoxy-β-D-ribofuranosyl)purine-6-thiol*

A suspension of 367 mg. (0.77 mmole) of 9-(2,5-di-O-benzoyl-3-deoxy-β-D-ribofuranosyl)purine-6-thiol is suspended in 3.5 ml. of dry methanol and a solution of 19.5 mg. of sodium in 3.5 ml. of dry methanol is added. Complete solution occurs immediately. The solution is refluxed for three hours, although no appreciable change in the ultraviolet absorption spectrum occurs after the first 45 minutes.

The solution is concentrated at reduced pressure and the residue is dissolved in 6 ml. of water. The pH of the solution is adjusted to 9 with acetic acid and the aqueous mixture is extracted with four 1.5-ml. portions of methylene chloride. The water layer is concentrated to a volume of 4 ml. and the pH is adjusted to 4 with acetic acid. After being kept at 5° C. for 0.5 hour, the mixture is filtered and the solid is washed with two 2-ml. portions of cold water.

The dried product (163 mg.; 79%) melts with decomposition at 202–206° C. Recrystallization of 86.6 mg. of this material gives 73.4 mg. (67%) of 9-(3-deoxy-β-D-ribofuranosyl)purine-6-thiol; M.P. 203–206° C.

$\lambda_{max}^{pH4}$ 322 mμ (a, 23,900), 223 mμ (a, 9,140); $\lambda_{max}^{pH11}$ 311 mμ (a, 21,200), 233 mμ (14,140); $[a]_D$ —41°, $[a]_{578}$ —44° (c, 0.5 in $H_2O$ plus one equivalent of NaOH).

*Analysis.*—Calc. for $C_{10}H_{12}N_4O_3S$: (268.3): C, 44.78; H, 4.51; N, 20.89; S, 11.95. Found: C, 44.82; H, 4.69; N, 20.93; S, 12.28.

*Example 4.—6-Methylamino-9-(3-deoxy - β - D-ribofuranosyl)purine*

A mixture of 1 g. (2.08 mmole) of 6-chloro-9-(2,5-di-O-benzoyl-3-deoxy-β-D-ribofuranosyl)purine and 8 g. of monomethylamine in 25 g. of dry methanol is heated for 10 hours at 100° C. in a sealed tube. The solution is concentrated to dryness at reduced pressure and the residue is dissolved in 25 ml. of water. The water solution is washed with two 5-ml. portions of benzene. The aqueous layer is treated for 2.5 hours with 3.5 g. of moist Dowex 1×8 ($CO_3$=) resin, during which time the pH of the solution rises from 7 to 9. The resin is removed and washed with three 15-ml. portions of water. The filtrate and washings are concentrated at reduced pressure to a volume of 5 ml. After being kept at 5° C. for 16 hours, the product (141 mg.; M.P. 185–193° C.) is removed. A second crop (78 mg.; M.P. 185–193° C.) is obtained from the filtrate. The two crops are combined and recrystallized from 2.5 ml. of water and 154 mg. (28%) of 6-methylamino-9-(3-deoxy-β-D-ribofuranosyl)purine (M.P. 193–194.5 C.) is obtained. TLC on cellulose in water shows only one UV absorbing spot at $R_f$ 0.62.

*Example 5(a).—9-(2,5-Di - O - benzoyl - 3 - deoxy-β-D-ribofuranosyl)purine*

A solution of 1 g. (2.08 mmole) of 6-chloro-9-(2,5-di-O-benzoyl-3-deoxy-β-D-ribofuranosyl)purine in 17 ml. of dioxane with 100 mg. (2.5 mmole) of magnesium oxide and 0.5 g. of 5% palladium on charcoal catalyst is shaken for 98 hours in an atmosphere of hydrogen at 25° C. The mixture is filtered and concentrated at reduced pressure to an oil (0.95 g.). The oil is chromatographed on a short alumina column in benzene:chloroform (1:4). Several fractions showing only one spot at $R_f$ 0.33 (TLC on alumina in the same solvent mixture as above) are pooled and give 400 mg. of the desired product as a glass.

Those fractions containing starting material ($R_f$ 0.62) are combined and rehydrogenated as above. After seven hours, reduction is complete and the product is worked up as before. A second crop (150 mg.) of product is obtained by chromatography. The yield of 9-(2,5-di-O-benzoyl-3-deoxy-β-D-ribofuranosyl)purine is 550 mg. (60%).

$\lambda_{inf.}^{EtOH}$ 280 mμ (a, 22,200); $\lambda_{max.}^{EtOH}$ 263 mμ (a, 81,700), 231 mμ (a, 284,000). $[a]_D$ —30°, $[a]_{578}$ —33° (c. 1 in $CHCl_3$).

*Analysis.*—Calc. for $C_{24}H_{20}N_4O_5$ (444.4): C, 64.86; H, 4.54; N, 12.61. Found: C, 64.95; H, 4.50; N, 12.56.

When 6-chloro-9-(2,5-di-O-benzoyl - 3-deoxy-β-D-ribofuranosyl)purine is replaced with equivalent amounts of 6-bromo-9-(2,5-di-O-benzoyl - 3 - deoxy-β-D-ribofuranosyl)purine, similar results are obtained.

*Example 5(b).—9-(3-Deoxy-β-D-ribofuranosyl)purine*

A solution of 410 mg. (0.93 mmole) of 9-(2,5-di-O-benzoyl-3-deoxy-β-D-ribofuranosyl)purine in 8 ml. of dry methanol is treated with a solution of 23 mg. (1 mmole) of sodium in 8 ml. of dry methanol. The pale-yellow solution is refluxed for three hours and concentrated to dryness at reduced pressure. The residue is dissolved in 15 ml. of water and the pH is adjusted to 6.5 with acetic acid. The solution is extracted with four 5-ml. portions of chloroform and the water phase is concentrated to dryness at reduced pressure. The semi-solid residue (670 mg.) is dissolved in 2.5 ml. of water and kept at 5° C. for 20 hours. The product (105 mg., M.P. 188–195° C.) is removed and the filtrate is concentrated to one-half its volume and a second crop (49.5 mg.) of product (M.P. 191–202° C.) is obtained.

The first crop when recrystallized from 1.5 ml. of water gives 82 mg. of product (M.P. 198–200° C.); while the second crop gives 37 mg. of product (M.P. 196–200° C.) from 0.3 ml. of water. Combination and recrystallization of these fractions from 1 ml. of water gives 82 mg. (37%) of 9-(3-deoxy-β-D-ribofuransoyl)-purine (M.P. 198–199° C.). TLC on cellulose shows only one UV absorbing spot at $R_f$ 0.89. $[a]_D$ —29°, $[a]_{578}$ —31° (c. 0.52 in $H_2O$)

$\lambda_{max.}^{pH7}$ 263 mμ (a, 7,630); $\lambda_{max.}^{pH4}$ 262.5 mμ (a, 7,370); $\lambda_{max.}^{pH11}$ 263 mμ (a, 7,520).

*Analysis.*—Calc. for $C_{10}H_{12}N_4O_3$ (236.2): C, 50.84; H, 5.12; N, 23.82. Found: C, 50.80; H, 4.86; N, 23.30.

*Example 6(a).—2-Acetamido-9-(2,5-di-O - 3 - deoxy-β-D-ribofuranosyl)hypoxanthine and 2-acetamido-7-(2,5-di-O-benzoyl-3-deoxy - β - D - ribofuranosyl)hypoxanthine*

About 25 ml. of xylene is distilled from a suspension of 5.95 g. (0.014 mmole) of chloromercuri-2-acetamido-hypoxanthine in 175 ml. of xylene in order to remove last traces of water. The suspension is cooled to 25° C. and 2,5-di-O-benzoyl-3-deoxy - β - D-ribofuranosyl bromide in 25 ml. of dry xylene is added. The mixture is stirred and heated. At about 50° C. to 100° C. the solid changes from a granular form to flocculent. After being refluxed for one hour the hot mixture is filtered which removes 5.5 g. of solid. Leaching the solid with three 50-ml. portions of boiling chloroform removes 1.9 g. of soluble product and leaves 3.6 g. of starting chloromercuri derivative and inorganic salts.

The original filtrate is diluted with two volumes of petroleum ether and the solid which separates is dissolved in the chloroform solution obtained above. The chloroform solution (plus an additional 100 ml.) is washed with two 75-ml. portions of 30% potassium iodide and one 75-ml. portion of water. The dried chloroform layer is concentrated and 3.5 g. of crude coupling product is obtained as a glass. TLC on alumina in acetone-ethyl acetate (3:1) shows zones (made visible with iodine vapor) at $R_f$ 0.0, 0.4, and 0.7.

The crude product is chromatographed on 50 g. of acid-washed alumina. Elution with 120 ml. of ethyl acetate removes 600 mg. of an impurity ($R_f$ 0.7) derived from the bromo sugar. Further elution with about 700 ml. of acetone removes 1.17 g. of another component ($R_f$ 0.4). This material is dissolved in 100 ml. of chloroform and washed with water. Concentration of the chloroform layer gives 1.05 g. (16.5%) of 2-acetamido-7-(2,5-di-O-benzoyl-3-deoxy-β-D-ribofuranosyl - hypoxanthine as an amorphous powder. $[a]_D$ —19.3°, $[a]_{578}$ —21° (c. 1 in $CHCl_3$).

$\lambda_{inf.}^{EtOH}$ 280 mμ (a, 12,100); $\lambda_{max.}^{EtOH}$ 267, 225 mμ (a, 14,580; 38,100)

*Analysis.*—Calc. for $C_{26}H_{23}N_5O_7$ (517.5): C, 60.34; H, 4.48; N, 13.53. Found: C, 60.80; H, 4.48; N, 13.49.

Column elution is continued with methanol (750 ml.) which removes 900 mg. of product of $R_f$ 0 on alumina TLC in the acetone-ethyl acetate (3:1) system. This material is dissolved in 200 ml. of chloroform and washed with two 20 ml. portions of water. Concentration of the filtered chloroform solution under reduced pressure gives 740 mg. (12%) of 2-acetamido-9-(2,5-di-O-benzoyl-3- deoxy-β-D-ribofuranosyl)hypoxanthine as an amorphous solid. $[a]_D$—72°, $[a]_{578}$—76° (c. 1.0 in $CHCl_3$).

$\lambda_{max.}^{EtOH}$ 282, 276, 260, 254, and 232 mμ (a, 11,900; 12,100; 15,000; 16,500; 27,900)

Analysis.—Found: C, 61.08; H, 4.75; N, 13.47.

*Example 6(b).—9-(3-deoxy-β-D-ribofuranosyl) guanine-(3'-deoxyguanosine)*

A suspension of 800 mg. of 2-acetamido-9-(2,5-di-O-benzoyl-3-deoxy-β-D-ribofuranosyl)hypoxanthine in 8 ml. of dry methanol is treated with a solution of 105 mg. (4.5 mmole) of sodium in 8 ml. of dry methanol and the mixture is refluxed for two hours. After 15 minutes of refluxing no further change in the ultraviolet absorption spectrum can be observed. The mixture is concentrated to dryness. The residue is dissolved in 35 ml. of water and the pH is adjusted to 7 by the addition of acetic acid. The clear solution is washed with three 8 ml. portions of chloroform and the aqueous layer is concentrated to a volume of 10 ml. After being cooled for several hours, the precipitated product (260 mg., 67%, M.P.>300° C.) is removed and washed with two 2.5 ml. portions of cold water. Recrystallization from 11 ml. of water gives 203 mg. of 9-(3-deoxy-β-D-ribofuranosyl) guanine. A second recrystallization gives 180 mg. of product which is dried at 80° C. and reduced pressure for analysis. $[a]_D$—41.2°, $[a]_{578}$—44° (c. 0.5 in $H_2O$). In water, $\lambda_{max.}^{pH7}$ 267.5 and 252.5 mμ (a, 8,620; 11,850); $\lambda_{max.}^{pH4}$ 267.5 and 252.5 mμ (a, 8,597; 11,940); $\lambda_{max.}^{pH11}$ 267.5 and 253 mμ (a, 8,950; 11,260)

Analysis.—Calc. for $C_{10}H_{13}N_5O_4$ (267.2): C, 44.94; H, 4.90; N, 26.21. Found: C, 44.90; H, 4.97; N, 26.24.

*Example 6(c).—7-(3-deoxy-β-D-ribofuranosyl)guanine*

A suspension of 900 mg. (1.74 mmole) of 2-acetamido-7-(2,5-di-O-benzoyl-3-deoxy-β-D - ribofuranosyl)guanine in 8 ml. of dry methanol is treated with a solution of 132 mg. (5.7 mmole) of sodium in 8 ml. of dry methanol and the mixture is refluxed for 3.5 hours. Periodic examination of the ultraviolet absorption spectrum indicates that the reaction is complete after 2.5 hours. The mixture is concentrated and the residue is dissolved in 40 ml. of water. The solution is washed with 15 ml. of chloroform and the pH of the aqueous phase is adjusted to 7 with acetic acid. The precipitated product (356 mg.) is filtered and washed with 5 ml. of water, 10 ml. of alcohol-ether (1:9), two 10 ml. portions of boiling chloroform and 10 ml. of ether. Two recrystallizations from water give 247 mg. (53%) of 7-(3-deoxy-β-D-ribofuranosyl)guanine, M.P.>300° C. $[a]_D$—10°, $[a]_{578}$—10° (c. 0.25 in 1N NaOH).

$\lambda_{max.}^{pH7}$ 286 and 217 mμ (a, 6,370; 19,100); $\lambda_{max.}^{pH4}$ 237.5 mμ (a, 5,600); $\lambda_{max.}^{pH11}$ 285 and 215 mμ (a, 6,250; 19,600); $\lambda_{inf.}^{pH7}$ 235 mμ (a, 6,050); $\lambda_{max.}^{pH4}$ 284 mμ (a, 5,070); $\lambda_{shd.}^{pH11}$ 240 mμ (a, 4,620)

Analysis.—Calc. for $C_{10}H_{13}N_5O_4$ (267.2): C, 44.94; H, 4.90; N, 26.21. Found: C, 45.00; H, 4.85; N, 26.47.

*Example 7.—6-chloro-9-(3-deoxy-β-D-ribofuranosyl) purine*

A solution of 479 mg. (0.1 mole) of 6-chloro-9-(2,5-di-O-benzoyl-3-deoxy-β-D-ribofuranosyl)purine in 20 ml. of cold methanol containing 2 g. of anhydrous ammonia is kept at 5° C. for 20 hours. The solution is concentrated at reduced pressure and at a temperature of less than 20° C. The residue is recrystallized from methanol to give 6-chloro-9-(3-deoxy-β-D-ribofuranosyl)purine.

When 6-chloro-9-(2,5-di-O-benzoyl-3 - deoxy - β - D-ribofuranosyl)purine is replaced with an equivalent amount of 6-bromo-9-(2,5-di-O-benzoyl-3-deoxy - β - D-ribofuranosyl)purine in the foregoing procedure, the corresponding 6-bromo-9-(3-deoxy-β - D - ribofuranosyl) purine compound is obtained.

*Example 8(a).—6-N-methylbenzamidopurine*

A mixture of 3 g. (0.02 mole) of 6-methylaminopurine and 11.3 g. (0.05 mole) of benzoic anhydride is heated to 205–210° C. for 20 minutes. A clear melt is obtained at 190° C. After being cooled to about 100° C., 30 ml. of ethanol is added and the solution is refluxed for 45 minutes. The solution is concentrated and the residual oil in 25 ml. of ethyl acetate yielded 1 g. of crystalline solid. Concentration of the filtrate gives an oil which is chromatographed on a short column of silica gel. Elution with ethyl acetate removes some fast-running impurities and the product (2.9 g.) is eluted with ethyl acetate-acetone (1:1). Dissolution of the product (3.9 g.) in 200 ml. of ethyl acetate followed by concentration to 20 ml. gives 3.45 g. (69%) of 6-N-methylbenzamidopurine, M.P. 187.5–189° C.

$\lambda_{max.}^{EtOH}$ 282.5 mμ (ε 11.800)

Analysis.—Calc. for $C_{13}H_{11}N_5O$: C, 61.65; H, 4.38; N, 27.66. Found: C, 61.75; H, 4.11; N, 27.70.

*Example 8(b).—Chloromercuri-6-N-methylbenzamidopurine*

A solution of 4.69 g. (18.5 mmole) of 6-N-methylbenzamidopurine and 5.02 g. (18.5 mmole) of mercuric chloride in 76 ml. of ethanol-water (1:1) is stirred and heated (70° C.) while 7.4 ml. (18.5 mmole) of 10% sodium hydroxide is added dropwise at a rate which does not allow a permanent yellow color to develop. The mixture is cooled and the colorless product is filtered and washed with water until the washings give a negative test for chloride ion. Washing is continued with two 60-ml. portions of ethanol and two 120-ml. portions of ether. After being dried over phosphorous pentoxide at 25° C. and reduced pressure the chloromercuri-6-N-methylaminopurine weighs 8.4 g. (93%).

Analysis.—Calc. for $C_{13}H_{10}N_5OHgCl$: C, 31.97; H, 2.06; N, 14.35. Found: C, 32.15; H, 2.09; N, 14.18.

*Example 8(c).—6-N-methylbenzamido-9-(2,5-di-O-benzoyl-3-deoxy-β-D-ribofuranosyl)purine*

About 150 ml. of xylene is distilled from a suspension of 9.5 g. (19.5 mmole) of chloromercuri-6-N-methylbenzamidopurine in 500 ml. of xylene. The mixture is cooled and a solution of 2,5-di-O-benzoyl-3-deoxy-D-ribofuranosyl bromide (from 6.9 g. [19.5 mmole] of methyl - 2,5-di-O-benzoyl-3-deoxy-β-D-ribofuranoside) in 50 ml. of dry xylene is added. The reaction mixture is stirred and refluxed for 30 minutes. The hot mixture is filtered and 3 g. of unreacted starting chloromercuripurine is recovered. The filtrate is concentrated to dryness and the residual oil in 300 ml. of chloroform is washed with two 100-ml. portions of 30% potassium iodide and two 100-ml. portions of water. The residual oil (10.3 g.) obtained after removal of the chloroform is chromatographed on a short column of 140 g. of acid-washed alumina in benzene-chloroform (1:9). Fractions containing only product, $R_f$ 0.4: TLC on alumina in benzene-chloroform (1:9), are combined. Fractions containing product and a small amount of impurity ($R_f$ 0.9) are rechromatographed. A total of 4.0 g. (52%, adjusted for chloromercuripurine recovered) of chromatographically pure 6 - N-methylbenzamido-9-(2,5-di-O-benzoyl-3-deoxy-β-D-ribofuranosyl)purine is obtained as a glass.

*Example 8(d).—6-methylamino-9-(3-deoxy-β-D-ribofuranosyl)purine*

A suspension of 3.9 g. (6.75 mmole) of the glass in 40 ml. of dry methanol is treated with a solution of 175 mg. (7.6 mmole) of sodium in 40 ml. of dry methanol and the solution is refluxed for 3.5 hours. The methanol is removed and the solution of the residue in 76 ml. of water is neutralized (pH 7.0) with acetic acid and washed with three 10-ml. portions of chloroform. The aqueous layer is concentrated to 15 ml. and, after being kept at 5° C. for 16 hours, 1.5 g. of product, M.P. 198–201° C. (a small amount of solid [sodium acetate] remained at 260° C.), is removed. Recrystallization from 25 ml. of water gives 1.3 g. (73%) of 6-methylamino-9-(3-deoxy-β-D-ribofuranosyl)purine, M.P. 196–197° C. $R_f$ 0.69, TLC on cellulose in water.

When the benzoic anhydride in step (a) of the foregoing procedure is substituted with equivalent amounts of acetic anhydride or propionic anhydride, the corresponding acetyl or propionyl intermediates are obtained and may be used in the subsequent production of 6-methylamino-9-(3-deoxy-β-D-ribofuranosyl)purine in (d) above.

*Example 9.—6-ethylamino-9-(3-deoxy-β-D-ribofuranosyl)purine*

A solution of 2.0 g. (4.17 mmole) of 6-chloro-9- (2,5-di-O-benzoyl-3-deoxy-β-D-ribofuranosyl)purine in 30 ml. of ethanol containing 12 ml. of ethylamine is heated in a sealed tube at 100° C. for 10 hours. After removing the solvent, the residue is dissolved in 60 ml. of water and extracted with three 15-ml. portions of ether. The aqueous layer (pH 6.5) is stirred for one hour with 2.5 g. of Dowex 2–X8 ($CO_3^=$) resin. The resin is removed and washed with four 10-ml. portions of water. The combined filtrate and washings are concentrated to 15 ml. The product crystallizes and after being kept at ice temperature several hours the mixture is filtered and the solid is washed with a small amount of cold water. The dried product, M.P. 165–167° C., weighs 400 mg. Concentration of the mother liquors gives a second crop (200 mg., M.P. 164–167° C.). Combination and recrystallization of these crops from 4 ml. of water gives 442 g. (38%) of 6-ethylamino - 9-(3-deoxy-β-D-ribofuranosyl)purine, M.P. 171–173° C. TLC on cellulose in water shows a single spot at $R_f$ 0.69. $[a]_D$ –39°, $[a]_{578}$ –42° (c. 1 in $H_2O$).

$\lambda_{max}^{pH1}$ 263 mμ (ε 16,800); $\lambda_{max}^{pH7}$ 268 mμ (ε 16,700); $\lambda_{max}^{pH}$ 268 mμ (ε 16,900)

*Analysis.*—Calc. for $C_{12}H_{17}N_5O_3$: C, 51.60; H, 6.14; N, 25.08. Found: C, 51.96; H, 6.07; N, 24.81.

Treatment of all of the filtrates from the above recrystallizations with 0.58 g. of picric acid in 35 ml. of water gives 600 mg. of 6-ethylamino-9-(3-deoxy-β-ribofuranosyl)purine picrate. Recrystallization from methanol gives 500 mg. of pure picrate.

*Analysis.*—Calc. for $C_{18}H_{20}N_8O_{10}$: C, 42.52; H, 3.97; N, 22.04. Found: C, 42.16; H, 3.80; N, 2174.

The picrate (487 mg) is added portionwise to a suspension of 5 g. of Dowex 2×8 ($CO_3^=$) in 25 ml. of water. The resin is filtered and washed, and the filtrate is concentrated to 2 ml. An additional 173 mg. (15%; total yield 53%) of product, M.P. 171–174° C. is obtained.

*Example 10.—6-chloro-9-(2,5-di-O-benzoyl-3-deoxy-β-D-ribofuranosyl)purine*

About 100 ml. of xylene is distilled from a suspension of 6.55 g. (16.8 mmole) of chloromercuri-6-chloropurine in 460 ml. of xylene in order to remove last traces of water. A solution of 6 g. (16.8 mmole) of 2,5-di-O-benzoyl-3-deoxy-D-ribofuranosyl bromide in 40 ml. of dry xylene is added to the stirred suspension at 25° C. The mixture is refluxed for two hours. Most of the solid has dissolved when the temperature has reached 60° C. The hot mixture is filtered which removes 1.4 g. of solid. The filtrate is concentrated to 150 ml. and diluted with 300 ml. of petroleum ether. The mixture is kept at 5° C. for one hour and filtered. The solid is washed with three 20-ml. portions of petroleum ether and dried. The crude product (8 g.) is dissolved in 300 ml. of hot chloroform and washed with two 80-ml. portions of 30% potassium iodide solution and two 80-ml. portions of water. The dried ($MgSO_4$) chloroform layer is concentrated and 5.2 g. of product is obtained as a glass. About 3.0 g. of product is purified by chromatography on a short alumina column in benzene-chloroform (1:9). Collection of fractions on the basis of homogeniety on TLC gives a total of 2.8 g. of 6-chloro-9-(2,5-di-O-benzoyl-3-deoxy-β-D-ribofuranosyl)purine as a glass. TLC on alumina in benzene-chloroform (1:9) shows a spot of $R_f$ 0.55.

$\lambda_{max}^{EtOH}$ 281 mμ (a, 2,730), 265 mμ (a, 9,960), 232 mμ (a, 28,000)

*Analysis.*—Calc. for $C_{24}H_{19}ClH_4O_5$ (478.9); C, 60.19; H, 4.00; N, 11.70; Cl, 7.40. Found: C, 59.53; H, 3.79; N, 11.55; Cl, 7.71.

*Example 11.—2,6-dibenzamido-9-(2,5-di-O-benzoyl-3-deoxy-β-D-ribofuranosyl)purine*

About 100 ml. of xylene is distilled from a suspension of 5.01 g. (8.43 mmole) of chloromercuri-2,6-dibenzamidopurine in 370 ml. of xylene to remove last traces of water. The suspension is cooled to room temperature and a solution of 3 g. (8.43 mmole) of 2,5-di-O-benzoyl-3-deoxy-β-D-ribofuranosyl bromide in 37 ml. of dry xylene is added while the suspension is being stirred. The mixture is refluxed for two hours and filtered hot removing 0.7 g. of insoluble material. The filtrate is diluted with 400 ml. of petroleum ether and cooled in an ice bath. The solid is removed and dried. The product (6.6 g.) is obtained as a complex with mercuric halide.

*Analysis.*—Calc. for $C_{38}H_{30}N_6O_7 \cdot HgBrCl$ (998.7); C, 45.70; H, 3.03; N, 8.42; Cl, 3.55. Found: C, 45.67; H, 3.01; N, 8.13; Cl, 3.92.

The product is dissolved in 100 ml. of chloroform and washed with two 40-ml. portions of 30% potassium iodide solution and two 40-ml. portions of water. The dried ($MgSO_4$) chloroform solution is concentrated at reduced pressure to 5.4 g. of 2,6-dibenzamido-9-(2,5-di-O-benzoyl-3-deoxy-β-D- ribofuranosyl)purine as a glass. An analytical sample is prepared by trituration with ether and drying at 80° C. at reduced pressure for 2.5 hours. $[a]_D$ +38° (c. 1 in $CHCl_3$).

$\lambda_{max}^{EtOH}$ 292 mμ (a, 18,700), 232 mμ (a, 47,800); $\lambda_{inf.}^{EtOH}$ 280 mμ (a, 12,300), 272 mμ (a, 22,300)

TLC on silica in ethylacetateacetone (1:1): $R_f$ 0.80.

*Analysis.*—Calc. for $C_{38}H_{30}N_6O_7$ (682.7); C, 66.85; H, 4.43; N, 12.31. Found: C, 66.50; H, 4.37, N, 12.05.

*Example 12(a).—Methyl-3-deoxy-β-D-ribofuranoside*

A solution of 1 g. (6.8 mmole) of methyl-2,3-anhydro-β-D-ribofuranoside in 50 ml. of ethanol is shaken in an atmosphere of hydrogen with 0.25 tsp. (approximately 0.75 g.) of Raney nickel catalyst at 80° C. The initial hydrogen pressure is 40 p.s.i.g. The reaction is complete after 12 hours as indicated by the uptake of the theoretical amount of hydrogen.

The resulting mixture is filtered, the catalyst washed with hot ethanol, and the combined ethanol solutions concentrated at about 25 mm. of mercury pressure. The product, methyl-3-deoxy-β-D-ribofuranoside, is obtained as an oil in 1.13 g. yield. Its infrared absorption spectrum shows bands at 2.92 μ ($OCH_3$) and essentially no band at 11.5 μ

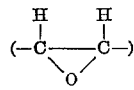

Confirmatory characterization of the deoxy-riboside is obtained by NMR spectroscopy.

The corresponding ethyl, propyl, hexyl, or decyl ribofuranosides are obtained when the above procedure is repeated using equivalent amounts of the ethyl, propyl, hexyl, or decyl anhydro ribofuranoside in place of methyl-2,3-anhydro-β-D-ribofuranoside.

Example 12(b).—Methyl-2,5-di-O-acetyl-3-deoxy-β-D-ribofuranoside

To a solution of 1.13 g. of methyl-3-deoxy-β-D-ribofuranoside in 13.7 ml. of dry pyridine, 2.7 ml. of acetic anhydride is added. The solution is kept at room temperature for 16 hours. Thereafter, 0.55 ml. of water is added with cooling and stirring. After about one hour, 55 ml. of chloroform is added and the solution is extracted with aqueous sodium bicarbonate until neutral. The chloroform solution is dried over magnesium sulfate, filtered and concentrated to give 1.69 g. of methyl-2,5-di-O-acetyl-3-deoxy-β-D-ribofuranoside which is characterized by infrared and NMR spectroscopy.

Example 12(c).—2,5-di-O-benzoyl-3-deoxy-D-ribofuranosyl bromide

A 33.8% solution of hydrogen bromide in acetic acid is prepared by dissolving 9.0 g. of hydrogen bromide in 17.6 g. of acetic acid.

To a solution of methyl-2,5-di-O-benzoyl-3-deoxy-β-D-ribofuranoside (2.0 g.; 5.62 mm.) in 10 ml. of acetic acid, is added 1 ml. acetyl bromide with cooling in an ice bath. Ten milliliters of the freshly prepared hydrogen bromide solution is next added and the solution is allowed to stand at room temperature for 20 minutes. The pale yellow solution is evaporated under 25 mm. of mercury pressure, keeping the water bath temperature at 30° C. Five 15-ml. portions of dry toluene are evaporated from the residual product at about 25 mm. of mercury pressure.

Example 13

The following example demonstrates the ability of the compounds of the present invention to inhibit nucleic acid biosynthesis. The method employed was that described by H. T. Shigeura and C. N. Gordon in J. Biol. Chem., 237, 1932 (1962). In this method 3.8 ml. of ascites cell suspension (6 to 9 x 10° cells/ml.) in Robinson's medium containing 0.2 M KHCO₃ and 0.1% glucose is incubated with hypoxanthine-8-$C^{14}$ (0.5 μc, 0.084 mmole) and the indicated amounts of test compound. The mixtures in 10 ml. Erlenmeyer flasks, are incubated with shaking for 30 minutes at 37° C. After acidification, the radioactivity in the acid insoluble fraction is determined. Table I shows the results of such tests.

TABLE I

| 9-(3-deoxy-β-D-ribo-furanosyl) | Hypoxanthine-8-$C^{14}$ Incorporation into Acid Insoluble RNA | | Cytotoxicity (ED₅₀, γ/ml.) | |
|---|---|---|---|---|
| | γ/ml. | Percent Inhibition | KB Cells | Chick Embryo Fibroblast Cells |
| Adenine | 120 | 45 | 25 | >10-<33 |
| | 370 | 85 | | |
| 2-amino-6-hydroxypurine | | | 100 | |
| 2,6-diaminopurine | 450 | 8 | 333 | |
| Purine-6-thiol | 600 | 0 | 100 | >333-<1,000 |
| 6-methylaminopurine | 600 | 43 | 6 | 50 |
| 6-ethylaminopurine | | | 30 | |
| 6-dimethylaminopurine | 500 | 28 | 33 | >100-<333 |
| Purine | 600 | 20 | >520 | >520 |

The results shown in the foregoing Table I are expressed as percent inhibition of the incorporation of hypoxanthine-8-$C^{14}$ as compared to control experiments carried out without the inhibitor.

The cytotoxicity of the compounds of the present invention was determined by using chick embryo fibroblast cells and KB cells. It will be noted from the table that 6-mercapto, 6-methylamino, and 6-dimethylamino compounds are from about three to ten times as active in the KB cell as in the chick embryo cell system.

Any departure from the above description which conforms to the present invention is intended to be included within the scope of the claims.

What is claimed is:

1. A compound of the structural formula

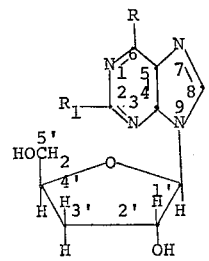

wherein R is hydrogen, halogen, mercapto, or lower alkyl substituted amino when R' is hydrogen; and wherein R is amino or hydroxy when R' is amino; provided also that when R is hydroxy the ribofuranosyl moiety may also be joined to the purine at the 7-position.

2. 6-chloro-9-(3-deoxy-β-D-ribofuranosyl)purine.
3. 2,6-diamino-9-(3-deoxy-β-D-ribofuranosyl)purine.
4. 6-methylamino-9-(3-deoxy-β-D-ribofuranosyl)purine.
5. 2-amino-6-hydroxy-9-(3-deoxy-β-D-ribofuranosyl)purine.
6. 6-dimethylamino-9-(3-deoxy-β-D-ribofuranosyl)purine.
7. 6-mercapto-9-(3-deoxy-β-D-ribofuranosyl)purine.
8. 9-(3-deoxy-β-D-ribofuranosyl)purine.
9. 2-amino-6-hydroxy-7-(3-deoxy-β-D-ribofuranosyl)purine.

References Cited

UNITED STATES PATENTS 2,852,505  9/1958  Baker et al. _____ 260—211.5
3,208,997  9/1965  Iwai et al. _____ 260—211.5

OTHER REFERENCES

Kaczka et al., "Chem. Abst.," vol. 60, 1964, p. 9626(d).

LEWIS GOTTS, *Primary Examiner.*

ELBERT L. ROBERTS, *Examiner.*

J. R. BROWN, *Assistant Examiner.*